United States Patent [19]

Hekker et al.

[11] Patent Number: 5,063,442
[45] Date of Patent: Nov. 5, 1991

[54] IMAGE CONVERTER

[75] Inventors: Roeland M.T. Hekker, Fairfield, Iowa; Ishak M. Livny, San Jose, Calif.

[73] Assignee: E. I. DuPont de Nemours & Company, Wilmintgon, Del.

[21] Appl. No.: 475,928

[22] Filed: Feb. 6, 1990

[51] Int. Cl.⁵ .............................................. H04N 7/18
[52] U.S. Cl. .................................. 358/93; 358/213.26; 358/236
[58] Field of Search ................. 358/93, 113, 110, 231, 358/236, 3, 90, 213.26

[56] References Cited

U.S. PATENT DOCUMENTS

| | | | |
|---|---|---|---|
| 3,834,786 | 9/1974 | Carlsen | 350/3.77 |
| 4,299,443 | 11/1981 | Minami et al. | 356/71 |
| 4,330,775 | 5/1982 | Iwamoto et al. | 382/8 |
| 4,462,046 | 7/1984 | Spight | 358/93 |
| 4,608,598 | 8/1986 | Murakami | 358/113 |
| 4,724,482 | 2/1988 | Duvent | 358/113 |
| 4,739,396 | 4/1988 | Hyatt | 358/236 |
| 4,878,116 | 10/1989 | Thomas | 358/113 |
| 4,952,809 | 8/1990 | McEwen | 358/113 |
| 4,963,963 | 10/1990 | Dorman | 358/113 |
| 4,987,479 | 1/1991 | Hopwood | 358/3 |

Primary Examiner—Howard W. Britton
Attorney, Agent, or Firm—Bell, Seltzer, Park & Gibson

[57] ABSTRACT

A flexible image converter may be used for many different applications and may be equipped to condition or alter the converted image. An image of an object is converted to an electrical signal, and digitalized. If desired, conditioning operations are performed on the digitalized image. The conditioned digitalized image may then be converted back to an analog image signal. The analog image signal is then displayed on a spatial light modulator. The image displayed on the spatial light modulator is then superimposed on an electromagnetic radiation beam to obtain the converted image representation of the object.

47 Claims, 3 Drawing Sheets

IMAGE CONVERTER

FIELD OF THE INVENTION

The invention relates to the conversion of an image superimposed on an electromagnetic radiation beam such as light, infrared, x-ray, radar or radio waves, into an image superimposed on a second electromagnetic radiation beam having certain characteristics; and more particularly, to a conversion system which is flexible and efficient.

BACKGROUND OF THE INVENTION

Image converters are employed in many areas. For example, since the human eye is not sensitive to electromagnetic radiation in the infrared region, a converter may be used to detect infrared radiation. The detected infrared scene may be displayed on a spatial light modulator (SLM). Converter systems may also be used for image projection. Once the image is displayed on the SLM, the user can view it on the SLM or project the image on a screen. The nature of this projected image is the product of the original image and the projecting light beam. Finally, a converter system may be used for optical signal processing.

Known converters generally include light sensing devices, such as a camera, an SLM, and a beam splitter. The camera captures the image of an object or scene. The SLM displays the image and spatially modulates the beam either in transmission or in reflection. The beam splitter, when employed, may split and combine the beams on which the image displayed by the SLM is superimposed. See, for example, U.S. Pat. No. 4,462,046. However, since known converters accomplish conversion in the optical domain they have little or no flexibility for specific applications. In addition, previous systems have not allowed low distortion pre-processing or conditioning of the video signal before conversion to a coherent signal.

SUMMARY OF THE INVENTION

Accordingly, it is an object of the present invention to provide for an improved electromagnetic radiation image converter.

It is also an object of the present invention to provide an electromagnetic radiation image converter having flexibility to adapt to different systems and applications.

It is another object of the present invention to provide an electromagnetic radiation image converter providing for low distortion conditioning or alteration of the image superimposed on the first type electromagnetic radiation beam before conversion to the second type electromagnetic radiation beam.

It is yet another object of the present invention to provide for preprocessing of the image contained on the electromagnetic radiation beam before conversion.

These and other objects of the present invention are accomplished by providing an optical signal which represents an image of an object, converting this optical signal into an electrical signal, and digitizing the electrical signal. If desired, conditioning or other processing operations may be performed on the digital signal representing the image. The conditioned digital signal representing the digitized image may then be converted back to an analog signal. The signal representing the image is then applied to a spatial light modulator (SLM). The image displayed on the spatial light modulator is then superimposed on an electromagnetic radiation beam having certain characteristics to obtain an image representation of the object having the certain characteristics. Preferably, the conditioning operations are performed by a frame buffer. Typical conditioning operations include edge enhancement, thresholding, and look-up table operations such as stretching.

The invention may be used for various types of conversion, such as coherent-to-incoherent or incoherent-to-coherent, coherent-to-coherent, incoherent-to-incoherent, or polarization.

The system of the present invention is especially well suited for optical signal applications. It provides means to capture an image, to enhance this image, and to display this image on the SLM. The system can also be used in optical correlation systems in which optical feedback is applied for recognition of an image. In general, the system of the present invention can be used where large amounts of two-dimensional data are generated, and fast processing to compress, analyze, and classify data is required. Examples are seismic data with oil drilling or data from surveillance satellites.

Thus, the instant invention achieves the objects of flexibility for various applications, and preconditioning of the image to be converted with less distortion than purely optical systems.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein; rather, Applicants provide these embodiments so that this disclosure will be thorough and complete, and will fully convey the scope of the invention to those skilled in the art. Like characters refer to like elements throughout.

Figure 1:
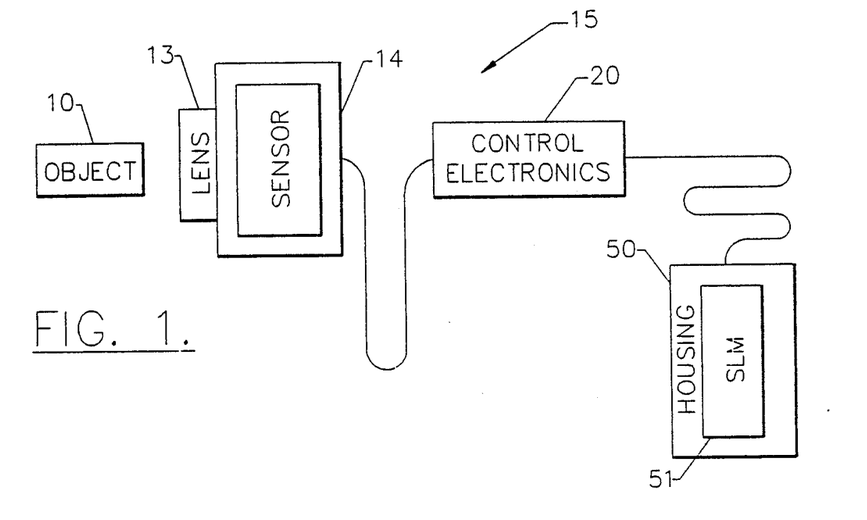
FIG. 1 is an overview block diagram of a conversion system according to the present invention.

Referring now to FIG. 1, the system of the present invention is shown in a configuration which provides the user with maximum flexibility to adapt the system to different applications. In this embodiment, the lens 13 and CCD sensor 14 are positioned within a single unit 15 to focus upon object 10. In addition, the frame buffer and control electronics are positioned in a single unit 20, while the spatial light modulator (SLM) 51 is carried by separate SLM housing 50. This structure allows the user to change the CCD sensor depending on the resolution and wave length sensitivity requirements. These wavelength sensitivity requirements result from the fact that some sensors are sensitive only in the blue region and others only in the infrared region. The features of the frame buffer can also be changed in this embodiment to adapt as much as possible to the properties of the spatial light modulator. The frame buffer adapts to the SLM. For example, some SLM's are driven as solid state memory. Moreover, these different SLM's can be used to perform different functions since different SLM's have various properties such as a special erase cycle required to erase information and memory that must be refreshed to be retained.

Figure 2:
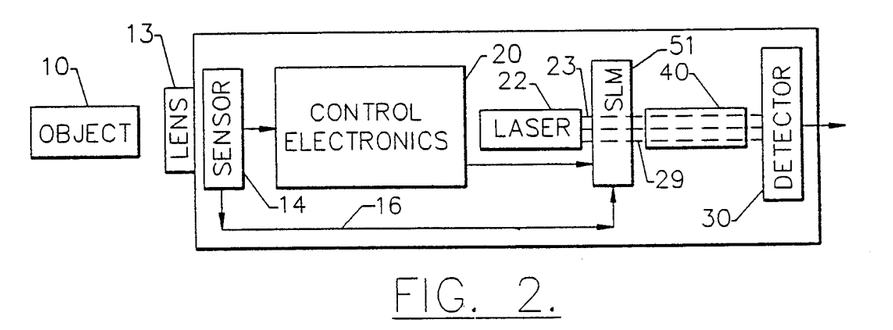
FIG. 2 is a block diagram of one embodiment of the present invention.

Referring now to FIG. 2, a first embodiment of the invention is shown. In this embodiment, a commonly available camera lens 13 positioned in front the charge controlled device (CCD) sensor 14 projects an image of the object 10 onto the CCD sensor 14. The CCD sensor 14 converts the different shades of light into proportional amounts of electrical charge. This electrical charge is shifted out of the light sensitive area, combined with the required timing signals, and appears at the output 16 of the CCD sensor 14 as a composite video signal.

The control electronics 20 transmits a signal relating to position to the frame buffer 20 telling the frame buffer to receive an image. The frame buffer then starts processing the image. The frame buffer first separates the timing signals from the composite video signal. The timing signals identify the pixels and determine the address of the memory location of each pixel (gray scale data) in the frame buffer memory. The video information is then fed to a sample and hold circuitry within the frame buffer and digitized by an analog to digital converter. The information is now available in digitized form and stored in frame buffer memory. Once the information is stored in memory, conditioning operations can be performed by the control electronics on the information. These operations may include thresholding, stretching, inverting and edge enhancement and are normally performed to enhance certain features of the image.

After performing the conditioning operations, the video data may be transformed back into the analog domain by means of a digital to analog converter contained within the frame buffer 20. Depending on the type of SLM in use, this analog data can be mixed with horizontal and vertical timing information. For example, where an LCD is used as an SLM, the analog data is mixed with the timing signals since the LCD operates like a television. Where an opto-magnetic SLM is used, the pixels are addressed in a way similar as solid state memory, therefore, mixing is unnecessary. The analog information is then transferred to the spatial light modulator 51. The image displayed on the SLM 51 is superimposed on a light beam 23 having certain characteristics. In FIG. 2, the light beam 23 is coherent and is supplied by laser diode 22. The light beam 23 transmits to the SLM 51 thereby superimposing the image displayed on the SLM on the coherent light beam 29. The information on the coherent light beam 29 is then ready for optical processing by optics 40 and for detection by a detection array 30. Optic and detection array processing are discussed in copending application, U.S. Ser. No. 920,513, filed Oct. 17, 1986, and now abandoned, assigned to the assignee of the present application, the disclosure of which is explicitly incorporated herein by reference.

Figure 3:
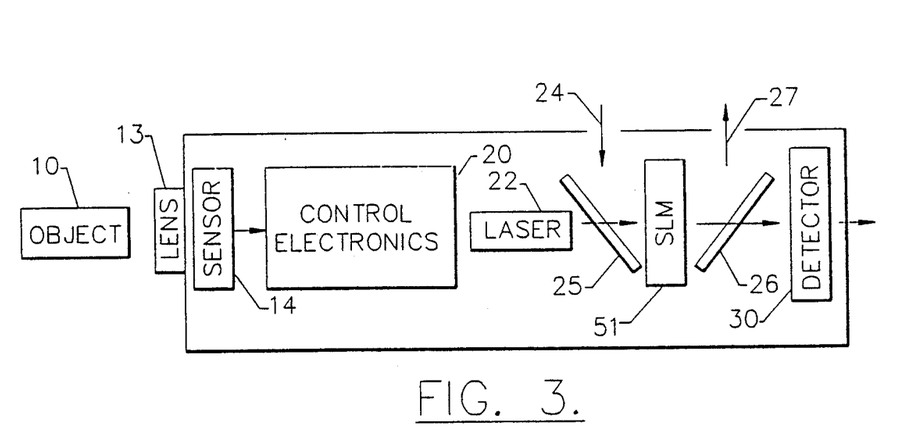
FIG. 3 is a block diagram of another embodiment of the present invention.

Referring now to FIG. 3, a second embodiment of the present invention is shown in which the user can vary the light beam for different applications. For example, the embodiment of FIG. 3 contains removable mirrors 25 and 26 which reflect an incoming light beam 24 in addition to or as a replacement for the light beam from laser diode 22. Since light beam 24 is external to the system, it can be varied. After reflecting off mirror 25, the light beam passes through the SLM 51. Mirror 26 reflects the light beam 27 with the image from the SLM superimposed on it. The laser diode 22 can remain within the system and be turned on or off as desired.

Figure 4:
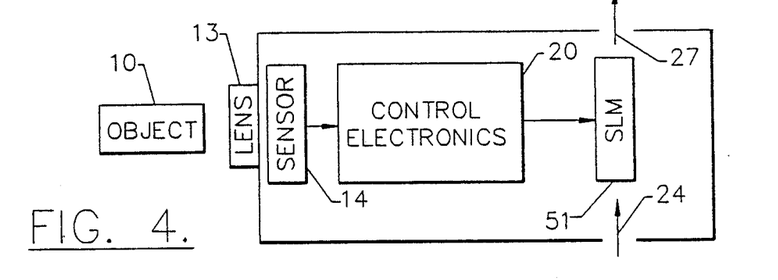
FIG. 4 is a block diagram of yet another embodiment of the present invention.

FIG. 4 illustrates a third embodiment of the present invention. A variable incoming light beam 24 is passed directly through SLM 51 to achieve the outgoing light beam 27 modulated by the image on the SLM.

Figure 5:
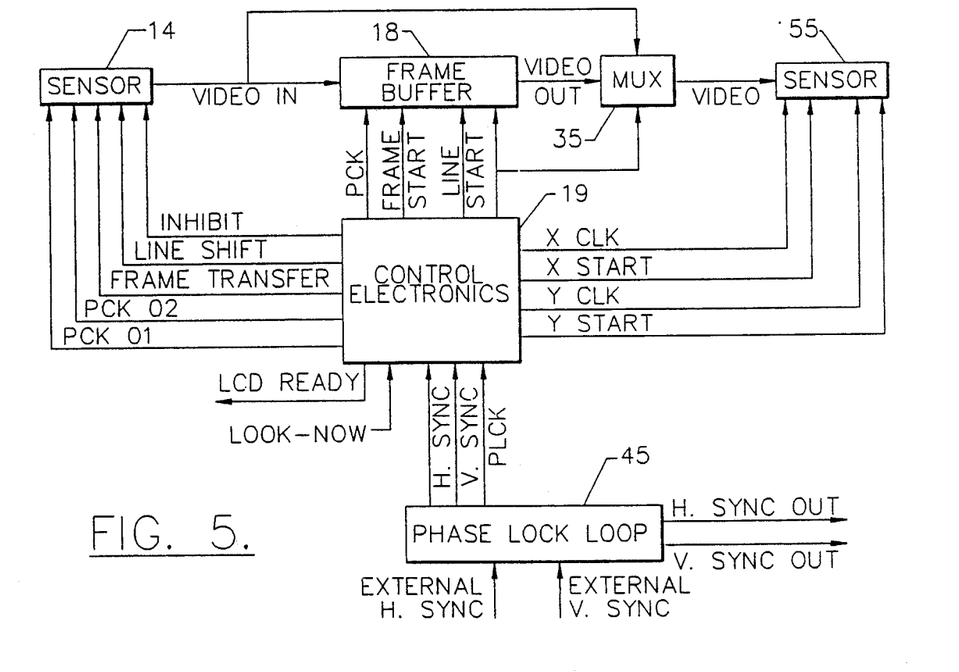
FIG. 5 is a schematic diagram of the components of one embodiment of the present invention.

Referring now to FIG. 5, a schematic diagram of the components of the converter is shown. In this system, acquisition of an image by the CCD sensor 14 is controlled by the INHIBIT signal. When the INHIBIT signal goes low, the CCD 14 starts its acquisition. During the time that the INHIBIT signal was high, the light sensitive sites (pixels) are connected to ground. Any charge created at a pixel will immediately flow to ground. Thus, the CCD will not register any image while the INHIBIT signal is high.

After the INHIBIT signal goes low, the CCD sensor will start shifting the electrical charge at each pixel. This shifting operation is controlled by the LINE SHIFT signal. During shifting, the information from the light sensitive area is read and transferred to the output gate of the camera 14.

Depending on the type of CCD device, several additional signals (POK01, PCK02) are required to properly execute the shifting operation. The signals indicated by POK01 and PCK02 are block waves with the same frequency, but with a different phase. They help to properly execute the shifting operation. The phase difference depends on the type of CCD sensor 14. Common phase shift values are 90° and 120°. Once the shifting operations are completed, the LINE SHIFT signal will go to low and the FRAME TRANSFER will go high. The electrical charges are then transferred to the output gate, mixed with the horizontal and vertical timing signals, yielding a resultant video signal. The video and timing signals are mixed in order to match the video signals to the correct pixel in order to reconstruct the image properly. This video signal is now available for further processing. The last step of adding the timing information can be omitted depending on what type of sensor is available and which SLM is being used. For example, timing information is required for the combination of a standard CCD with a liquid crystal SLM.

Next, the frame buffer 18 will receive a signal from the control electronics 19 to acquire or grab an image from the CCD sensor 14. This happens every time the ACQUIRE or GRAB signal goes high thereby activating frame buffer 18 hardware. The frame buffer first separates the timing signals from the composite video signal. The video information is then fed to sample and hold circuitry within the frame buffer and digitized by an analog-to-digital converter within the frame buffer 18. The information is now available in digitized form and stored in memory. Once in memory, the conditioning operations may be performed on the digitized data. After the conditioning operations are performed, the digitized data is transferred back into the analog domain by means of a digital to analog converter contained in the frame buffer 18. Depending on the type of SLM in use, this analog data can be mixed with horizontal and vertical timing information. For example, timing information is required for the combination of the standard CCD with liquid crystal SLM.

In addition to the GRAB signal, the frame buffer 18 also uses the LINE START and FRAME START signals and the PCK signal, representing the system clock. The PCK signal determines the rate at which samples are taken and digitized. The line signal indicates when a new line in the image starts, while the frame start signal indicates where the video frame starts. Synchronization may be provided by phase lock loop synchronization 45.

Figure 6:
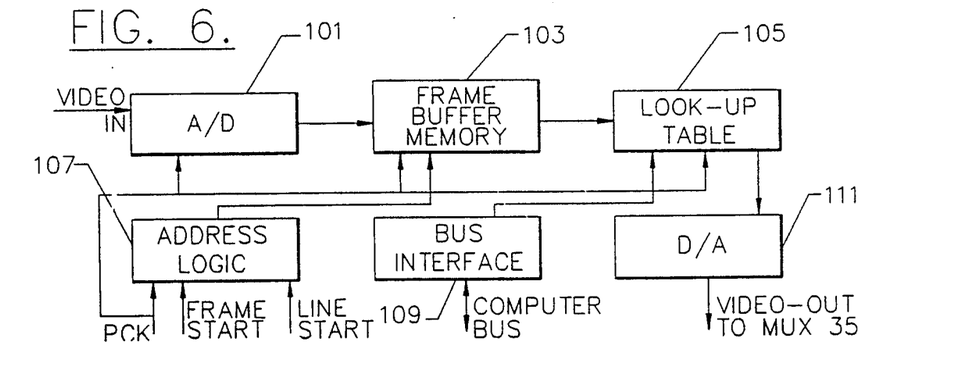
FIG. 6 is a schematic diagram of the frame buffer.

Referring to FIG. 6, the frame buffer consists of the following building blocks: analog to digital converter 101, frame buffer memory 103, look-up table logic and memory 105, address logic 107, bus interface 109, digital to analog converter 111. An image acquired by the image sensor will be sent to the frame buffer. This video signal is generally ignored unless the frame buffer also receives an instruction via the acquired signal from the control electronics to grab the image.

Processing of an image proceeds as follows: Referring back to FIG. 5, an image is acquired with image sensor, 14. The acquired image is sent to the frame buffer 18. The control electronics 19 indicates to the frame buffer 18 via the acquired signal that the image is to be processed. Referring back to FIG. 6, the analog to digital module 101 converts the image from an analog presentation to a digital one. This happens in a pixel by pixel fashion. Each time a pixel is converted the converted pixel is transmitted to the frame buffer memory. The address logic 107 generates the appropriate address for each pixel conversion. This activity occurs in parallel with the image conversion. The address is transmitted to the frame buffer memory 103 at the same time the corresponding pixel is transmitted from the analog to digital conversion module 101 to the frame buffer memory. The frame buffer memory sends the information pixel by pixel to the look up table logic and memory module 105. This module processes the pixel and transmits the processed pixel to the digital to analog conversion module 111. This last module converts the processed pixel from a digital representation to an analog presentation. From there the information is sent to the multiplexer 35 (FIG. 5).

The control electronics 19 determines whether the system works in a static mode or dynamic mode. In the static mode, the object is stationary. A single image of the object can be acquired or, if so desired, several images can be acquired to do operations like averaging, or the device can continuously acquire images and display these images on the SLM. In the static mode there are two ways the image can be fed from the image sensor to the SLM. One is via the frame buffer, the other bypasses the frame buffer and feeds directly into the multiplexer 35. The image sensor continuously processes images in this mode. In the first static mode, only one or a specified number of images are acquired by the frame buffer, processed and fed to the SLM via the multiplexer 35. In the second static mode, where the image sensor is directly connected to the multiplexer 35, all the images that appear at the output of the image sensor are fed to the spatial light modulator via the multiplexer 35. The multiplexer 35 allows the system to feed the image directly to the SLM without any interaction by the frame buffer.

In the dynamic mode, the system captures one image of a moving object. To prevent blur, the user may employ conventional techniques like light strobes. In the static mode, the video information from the CCD sensor 14 is directly fed to the multiplexer effectively bypassing the frame buffer 18 as shown in FIG. 5. In the dynamic mode, the multiplexer is controlled by the GRAB signal. When the GRAB signal is high, the video information of the frame buffer 18 is fed to the SLM. After this is done for several frames in the case of a passive liquid crystal display or for a single frame in the case of a Litton Magneto-Opto SLM, the LCD READY signal will go high, indicating to the user that the displayed information is ready for further processing. It is up to the user to determine how many times an image is fed to the SLM. Basically, the multiplexer functions like a switch which allows the user to select between the two ways that determine how the image is fed to the SLM.

As mentioned before, several different types of SLM's can be used with this device. The interface between the control electronics, multiplexer, and SLM is largely determined by the SLM. In a number of cases it will even affect the design of the frame buffer as some of the SLM's accept image data in digitized form.

All SLM's require a signal that transfers the image data (video), as well as a signal that informs the SLM where the image starts and to which line the information has to be written (X-start) and to which pixel column (Y-start). Since the number of lines do not necessarily equal the number of pixel columns, two separate clock signals are required to address the SLM (line clock and pixel clock). The control electronics 19 and the phase locked loop 45 circuitry provide the control, synchronization and interface with devices outside the system. After the control electronics 19 receives a "look now" signal from a source external to the system indicating that the object is ready and a picture should be taken, the control electronics 19 will generate the necessary signals in the right sequence for the different modules. The control electronics will first pull the inhibit signal low to allow the CCD sensor 14 to start taking an image of the object.

In summary, the control electronics 19 comprise all the logic circuitry to control the other units of the device and all the timing circuitry to generate the required clock signals.

After the CCD sensor 14 has gone through its cycle and the image is available, the frame buffer 18 will start digitizing and storing the image. The frame buffer 18 will then feed the image via the multiplexer 35 to the SLM. The LCD ready signal will go high after the image has been fed to the SLM for the required number of repetitions.

Synchronization of the device can be accomplished in two ways: internally and externally. For internal generation of timing signals a phase lock loop 45, a crystal oscillator or any other means that generates an electrical signal(s) with a very stable frequency may be used. All other timing signals like horizontal sync (H SYNC), vertical sync (V SYNC), and phase clock (PCK) are derived from the phase locked loop output signal. These signals are available to the user and they are represented by H SYNC out and V SYNC out.

Figure 7:
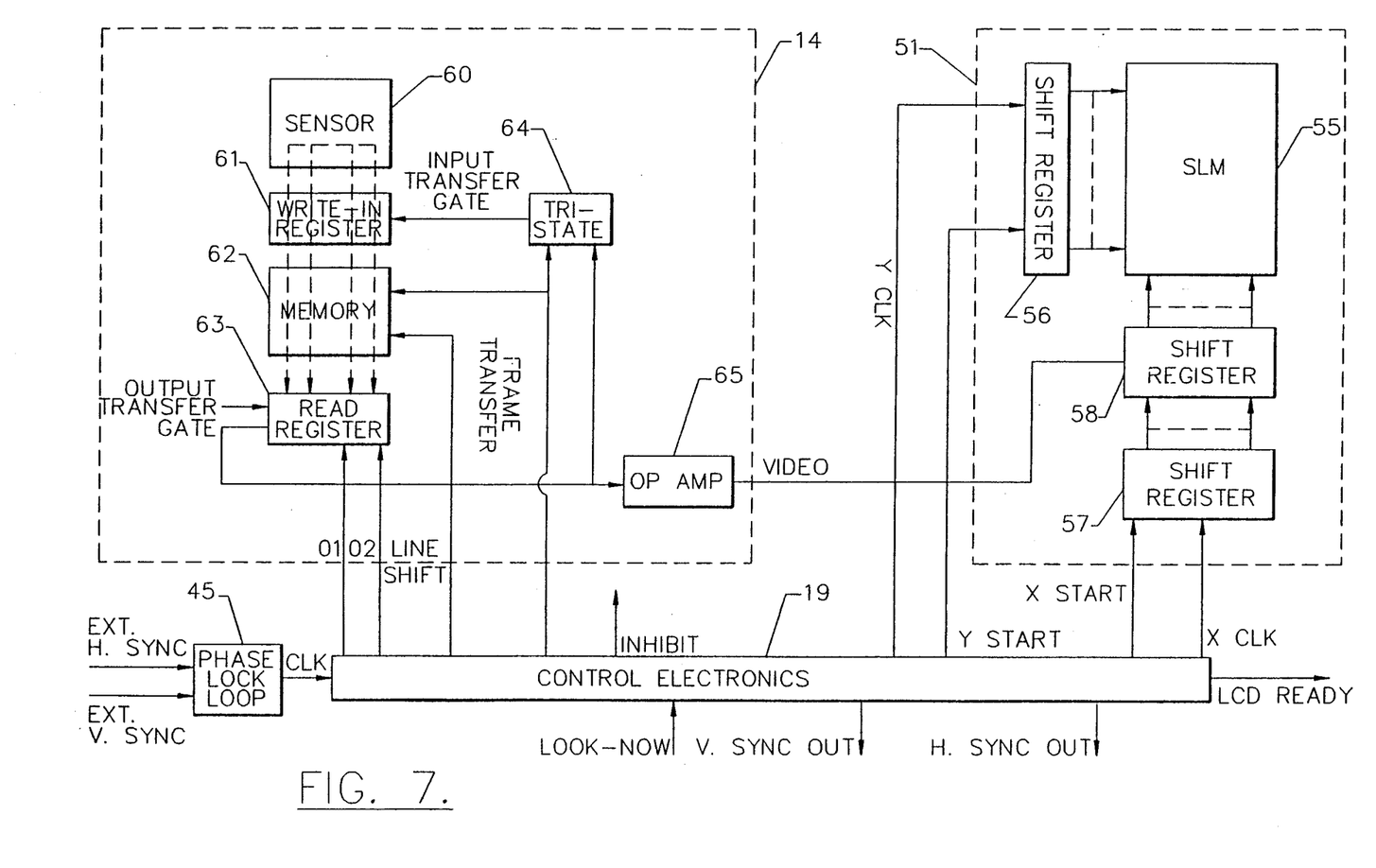
FIG. 7 is a schematic diagram of the modified image sensor version of the present invention.

A second embodiment of the present invention is shown in FIG. 7. This embodiment takes advantage of the fact that a large number of image sensors already have a built in memory. The embodiment under consideration utilizes this memory to temporarily store the image. From there the images are fed directly to the SLM. As a result the frame buffer electronics are eliminated resulting in cost reduction. For the case in which reading the information into memory results in an erasure of the memory it is assumed that the image sensor has a means such that a copy of the information read from the memory can be written back into the memory. The following describes such an embodiment where the image sensor does not have the memory refresh described in the preceding sentence.

Such an embodiment has the following components: CCD image sensor 60, CCD-memory 62, read register 63, video operational amplifier 65 and an LCD with active matrix 55 and shift registers 56, 57, 58. To implement the rewrite feature, discussed above, a CCD shift register, called write-in register 61 and a tri-state buffer 64 is added. The shift register is functionally located between the image sensor 60 and the memory 62. The type of memory used in a number of image sensors lose the information upon a read operation. The additional CCD shift register, 61 allows the information to be written back into the memory, thereby negating the effect of the read operation.

In operation, this embodiment functions as follows: An image of an object is detected in the image sensing area 60 of the image sensor. The resulting electrical signal is then transferred via the write-in register 61 to the memory 62. (At this time the write-in register 61 only transmits the information). During this time the tri-state buffer 64 is in a high impedance state to prevent information from leaking away. After the image information is read into memory 62, it can be read out. If one decides to read out the image and to save the image then two functions are executed concurrently. The first row of data is read from memory 62 by the read-out register 63. This information is then simultaneously fed to the video operational amplifier 65 and the tri-state buffer 64. The tri-state buffer will transfer a copy of the row to the write-in register 61. The information in the memory 62 is now empty. The write-in register 61 now writes the information from its register to this upper row of the memory 62. Meanwhile, the video operational amplifier 65 converts the output from the read out register 63 into a standard video signal. The cycle then repeats itself until the whole image is read out and fed to the SLM 51.

For the embodiment of an LCD with an active matrix 55 shown in FIG. 7, the signal processing proceeds as follows: The signal is sampled by the sample and hold register 57 and is shifted into the X-shift register 58. This is done until the shift register is completely filled. Then the information is transmitted to the LCD matrix 55. The appropriate line in the LCD matrix will be activated by the Y driver 56 which is in turn directed by the Y clock signal and the Y start signal. In the meantime, the X shift register 58 is filled up again with the next line of information.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. An image conversion method for converting a coherent image to one of a coherent image and an incoherent image, comprising the steps of:

providing a first coherent two dimensional electromagnetic radiation image;

converting said first coherent two dimensional electromagnetic radiation image into a digital signal;

applying said digital signal to a two dimensional spatial light modulator; and impinging one of coherent and incoherent electromagnetic radiation onto said two dimensional spatial modulator to produce a corresponding second one of a coherent and an incoherent two dimensional electromagnetic radiation image from said first coherent two dimensional electromagnetic radiation image.

2. The method of claim 1 wherein said converting step is followed by the step of:

operating upon said digital signal to produce a modified digital signal; and wherein said applying step comprises the step of: applying the modified digital signal to a two dimensional spatial light modulator.

3. The method of claim 1 wherein said applying step comprises the step of:

converting said digital signal to an analog signal and applying said analog signal to a two dimensional spatial light modulator.

4. A method for converting a coherent image to one of a coherent image and an incoherent image, comprising the steps of:

(a) providing a coherent image;

(b) converting said coherent image into a first analog signal;

(c) converting said first analog signal to a digital signal;

(d) converting said digital signal to a second analog signal;

(e) applying said second analog signal to a spatial light modulator; and (f) impinging one of a coherent and an incoherent electromagnetic radiation beam having predetermined characteristics onto said spatial light modulator to obtain a corresponding one of a coherent and an incoherent image with said predetermined characteristics.

5. The method of claim 4 wherein said predetermined characteristics comprise at least one of the following characteristics: polarization, temporal features, and spatial coherence.

6. The method of claim 4 wherein said applying step comprises the step of:

converting said digital signal to an analog signal and applying said analog signal to a two dimensional spatial light modulator.

7. The method of claim 4 wherein said digital converting and applying steps (c)–(e) are performed by a frame buffer.

8. The method of claim 7 wherein said converting step (c) comprises the steps of:

converting said first analog signal to said digital signal;

storing said digital signal;

receiving said digital signal from said storing means and performing operations on said digital signal as directed by logic means; and converting said operated upon digital signal to a second analog signal.

9. The method of claim 4 wherein the following step is performed on said digital signal between steps (c) and (e):

conditioning said digital signal.

10. The method of claim 9 wherein said conditioning step comprises:

performing a thresholding operation on said digital signal.

11. An apparatus for converting an incoherent image to a coherent image, comprising:
(a) means for providing an image;
(b) means for converting said image into a first analog signal;
(c) means for converting said first analog signal to a digital signal;
(d) means for applying said digital signal to a spatial light modulator; and
(e) means for impinging an electromagnetic radiation beam having predetermined characteristics onto said spatial light modulator to obtain an image with said predetermined characteristics;
wherein said means for digital converting, and means for applying (c)–(d) comprise a frame buffer; and
wherein said frame buffer comprises:
an analog to digital converter for receiving and converting said first analog signal to said digital signal in a pixel-by-pixel fashion;
memory means for receiving said digital signal;
addressing means connected to said memory means for generating an address for each pixel;
look-up table logic means and associated memory means for receiving said digital signal from said memory means and performing operations on said digital signal as directed by said logic means; and
a digital to analog converter for receiving and converting said operated upon digital signal to a second analog signal.

12. The apparatus of claim 11 wherein said predetermined characteristics comprise at least one of the following: polarization, temporal differences and spatial coherence.

13. The apparatus of claim 11 wherein said image is an incoherent image and said beam is a coherent light beam.

14. The apparatus of claim 11 wherein said image is a coherent image and said beam is an incoherent light beam.

15. The apparatus of claim 11 wherein said image is a coherent image and said beam is a coherent light beam.

16. The apparatus of claim 11 wherein said image is an incoherent image and said beam is an incoherent light beam.

17. The apparatus of claim 11 wherein said means for applying comprises:
means for converting said digital signal to an analog signal and applying said analog signal to a two dimensional spatial light modulator.

18. The apparatus of claim 11 further including means, connected to means (c), for conditioning said digital signal.

19. The apparatus of claim 18 wherein said means for conditioning said digital signal performs a thresholding operation on said digital signal.

20. An apparatus for converting a coherent image to one of a coherent image and an incoherent image, comprising:
(a) means for providing a coherent image;
(b) means for converting said coherent image to a first analog signal;
(c) means for converting said first analog signal to a digital signal;
(d) means for performing conditioning operations on said digital signal;
(e) means for converting said digital signal to a second analog signal;
(f) means for applying said second analog signal to a spatial light modulator; and
(g) means for impinging one of a coherent and an incoherent electromagnetic radiation beam having predetermined characteristics onto said spatial light modulator to obtain a corresponding one of a coherent and an incoherent electromagnetic radiation image having said predetermined characteristics.

21. The apparatus of claim 20 wherein said conditioning means comprises means for performing a thresholding operation on said digital signal.

22. The apparatus of claim 20 wherein said means for applying comprises:
means for converting said digital signal to an analog signal and applying said analog signal to a two dimensional spatial light modulator.

23. An apparatus for converting an image to an image, comprising:
(a) means for providing an image;
(b) means for converting said image to a first analog signal;
(c) means for converting said first analog signal to a digital signal;
(d) means for performing conditioning operations on said digital signal;
(e) means for converting said digital signal to a second analog signal;
(f) means for applying said second analog signal to a spatial light modulator; and
(g) means for impinging an electromagnetic radiation beam having predetermined characteristics onto said spatial light modulator to obtain an electromagnetic radiation image having said predetermined characteristics;
wherein said performing conditioning operations step is performed by a frame buffer; and
wherein said frame buffer comprises:
an analog to digital converter for receiving and converting said first analog signal to said digital signal in a pixel-by-pixel fashion;
memory means for receiving said digital signal;
addressing means connected to said memory means for generating an address for each pixel;
look-up table logic means and associated memory means for receiving said digital signal from said memory means and performing operations on said digital signal as directed by said logic means; and
a digital to analog converter for receiving and converting said operated upon digital signal to a second analog signal.

24. A method for converting a coherent image to one of a coherent image and an incoherent image, comprising the steps of:
(a) providing a coherent image;
(b) converting said coherent image to a first analog signal;
(c) converting said analog signal to a digital signal;
(d) performing conditioning operations on said digital signal;
(e) converting said digital signal to a second analog signal;
(f) applying said second analog signal to a spatial light modulator; and
(g) impinging one of a coherent and an incoherent electromagnetic radiation beam having predetermined characteristics onto said spatial light modulator to obtain a corresponding one of a coherent and an incoherent electromagnetic radiation image with said predetermined characteristics.

25. The method of claim 24 wherein said conditioning step comprises the step of performing thresholding operations on said digital signal.

26. The method of claim 24 wherein said conditioning step comprises the step of performing look-up table operations on said digital signal.

27. The method of claim 24 wherein said performing conditioning operations step is performed by a frame buffer.

28. The method of claim 24 wherein said applying step comprises the step of:
converting said digital signal to an analog signal and applying said analog signal to a two dimensional spatial light modulator.

29. A method for converting an image, comprising the steps of:
(a) providing an image;
(b) converting said image to a first analog signal;
(c) converting said analog signal to a digital signal;
(d) performing conditioning operations on said digital signal;
(e) converting said digital signal to a second analog signal;
(f) applying said second analog signal to a spatial light modulator; and
(g) impinging an electromagnetic radiation beam having predetermined characteristics onto said spatial light modulator to obtain an electromagnetic radiation image with said predetermined characteristics;
wherein said performing conditioning operations step is performed by a frame buffer; and
wherein said frame buffer comprises:
an analog to digital converter for receiving and converting said first analog signal to said digital signal in a pixel-by-pixel fashion;
memory means for receiving said digital signal;
addressing means connected to said memory means for generating an address for each pixel;
look-up table logic means and associated memory means for receiving said digital signal from said memory means and performing operations in said digital signal as directed by said logic means; and
a digital to analog converter for receiving and converting said operated upon digital signal to a second analog signal.

30. An apparatus for converting an image, comprising:
(a) an image sensor for obtaining an image;
(b) means for converting said image into a first analog signal;
(c) a frame buffer for receiving said first analog signal, converting said first analog signal to a digital signal, conditioning said digital signal, and converting said conditioned digital signal to a second analog signal;
(d) a spatial light modulator for receiving and displaying said second analog signal;
(e) a first mirror positioned to receive an electromagnetic radiation beam having predetermined characteristics and reflect said beam through said spatial light modulator so as to superimpose said second analog signal on said beam; and
(f) a second mirror positioned to reflect said beam with said second analog signal superimposed thereon.

31. The apparatus of claim 30 further including means for detecting said beam with said second analog signal superimposed thereon.

32. The apparatus of claim 30 further including optic means for analyzing said beam with said second analog signal superimposed thereon.

33. The apparatus of claim 30 further including digital means for analyzing said beam.

34. The apparatus of claim 30 wherein said frame buffer comprises:
an analog to digital converter for receiving and converting said first analog signal to said digital signal in a pixel-by-pixel fashion;
memory means for receiving said digital signal;
addressing means connected to said memory means for generating an address for each pixel;
look-up table logic means and associated memory means for receiving said digital signal from said memory means and performing operations on said digital signal as directed by said logic means; and
a digital to analog converter for receiving and converting said operated upon digital signal to a second analog signal.

35. The apparatus of claim 30 wherein said image is an incoherent image and said beam is a coherent beam.

36. The apparatus of claim 30 wherein said image is a coherent image and said beam is an incoherent beam.

37. The apparatus of claim 30 wherein said image is a coherent image and said beam is a coherent light beam.

38. The apparatus of claim 30 wherein said image is an incoherent image and said beam is an incoherent light beam.

39. An apparatus for converting an image, comprising:
(a) an image sensor for obtaining an image;
(b) means for receiving said image and converting said image into a first video signal;
(c) a frame buffer for receiving said first video signal, converting said first video signal to a digital signal, conditioning said digitalized first video signal, and converting said conditioned digitalized first video signal to a second video signal;
(d) a multiplexer for receiving said first and second video signals for producing a third video signal;
(e) a spatial light modulator for receiving and displaying said third video signal;
(f) an electromagnetic radiation source producing an electromagnetic radiation beam having predetermined characteristics which passes through said spatial light modulator displaying said third video signal so as to superimpose said third video signal on said coherent beam; and
(g) means for coordinating said image sensor, frame buffer, multiplexer, spatial light modulator, and electromagnetic radiation source.

40. The apparatus of claim 39 wherein said multiplexer comprises:
means for determining how many times one of said third video signal and said first video signal is received by said spatial light modulator.

41. The apparatus of claim 39 further including means for detecting said beam.

42. The apparatus of claim 39 further including optic means for analyzing said beam.

43. The apparatus of claim 39 further including digital means for analyzing said beam.

44. The method of claim 39 wherein said image is an incoherent image and said beam is a coherent light beam.

45. The method of claim 39 wherein said image is a coherent image and said beam is an incoherent light beam.

46. The method of claim 39 wherein said image is a coherent image and said beam is a coherent light beam.

47. The method of claim 39 wherein said image is an incoherent image and said beam is an incoherent light beam.

* * * * *